United States Patent [19]

Springston

[11] 4,404,244
[45] Sep. 13, 1983

[54] SYSTEM FOR RAPID REPAIR OF DAMAGED AIRFIELD RUNWAYS

[75] Inventor: Preston S. Springston, Oxnard, Calif.

[73] Assignee: The United States of America as represented by the Secretary of the Navy, Washington, D.C.

[21] Appl. No.: 437,092

[22] Filed: Oct. 27, 1982

[51] Int. Cl.³ .............................................. B32B 5/12
[52] U.S. Cl. ..................................... 428/109; 156/71; 156/92; 156/94; 404/72; 404/75; 422/111; 422/131; 422/137; 422/133; 422/236; 422/245; 422/246; 422/251; 422/266; 422/273; 422/225; 422/290; 422/192; 422/193
[58] Field of Search ................... 404/72, 75; 428/236, 428/246, 251, 268, 273, 285, 290, 192, 131, 137, 111, 113, 233, 234, 235, 245, 109, 193; 156/71, 92, 94

[56] References Cited

U.S. PATENT DOCUMENTS 4,353,947 10/1982 Northcutt ............................ 428/251
4,374,170 2/1983 Fesko .................................. 428/285

Primary Examiner—James J. Bell
Attorney, Agent, or Firm—Robert F. Beers; Joseph M. St.Amand

[57] ABSTRACT

A membrane of fiberglass-reinforced polyester resin is used as a trafficable cover over a compacted backfilled crater and crushed stone base to impart strength to the repair and prevent foreign object damage to aircraft. The membrane cover is usually prefabricated from several fiberglass matting layers of chopped fiberglass strands chemically bonded to woven fiberglass roving and impregnated with a polyester resin; an anchoring system consisting of holes along the cover perimeter and torque set rock bolts are used in conjunction with special steel bushings to secure the cover to airfield pavement surrounding the crater.

20 Claims, 7 Drawing Figures

SYSTEM FOR RAPID REPAIR OF DAMAGED AIRFIELD RUNWAYS

BACKGROUND OF THE INVENTION

This invention relates to a system for rapid emergency repair of damaged airfield runways and pavements.

Damage to runways and the like caused by bomb damage and other disasters frequently necessitate rapid emergency repairs to avoid or minimize interruption of essential operations. A prior method for patching such damaged pavements involves the use of a mat assembly of aluminum panels for bridging the damaged areas; however, this method is expensive, materials are not readily procured, and it is too complex and time consuming to use for most emergency situations.

Further, existing runway repair means present roughness problems which induce vibrations that can cause release of auxiliary fuel tanks on aircraft or other damage during take off or landing.

SUMMARY OF THE INVENTION

It is therefore an object of the present invention to provide a system for the rapid repair of damaged airfield runways and pavements, and for rehabilitating bomb damaged airfield pavements rapidly in a manner which provides low profile and minimizes runway surface roughness.

The present invention utilizes a membrane of fiberglass-reinforced polyester resin as a trafficable cover over a backfilled crater; for example, the cover imparts strength to the repair and prevents foreign object damage to aircraft. The membrane cover is usually pre-fabricated from several fiberglass matting layers of chopped fiberglass strands chemically bonded to woven fiberglass roving and impregnated with a thermosetting, low pressure, wet layup type polyester resin. Holes for anchoring the membrane to the airfield runway pavement are provided along the cover edges. The anchoring system consists of torque set rock bolts used in conjunction with special steel bushings which fit the holes formed along the edges of the membrane.

The membrane cover used in the system is lighter in weight, less expensive and easier to produce, and materials are readily procured from a large nember of sources. In addition the present cover provides a low profile which reduces risk of structural damage to aircraft and the cover itself is more readily repaired than devices used with prior systems.

BRIEF DESCRIPTION OF THE DRAWINGS

FIG. 5b is a cross-sectional view taken along line 5b—5b of FIG. 5a.

DESCRIPTION OF THE PREFERRED EMBODIMENT

Figure 1:
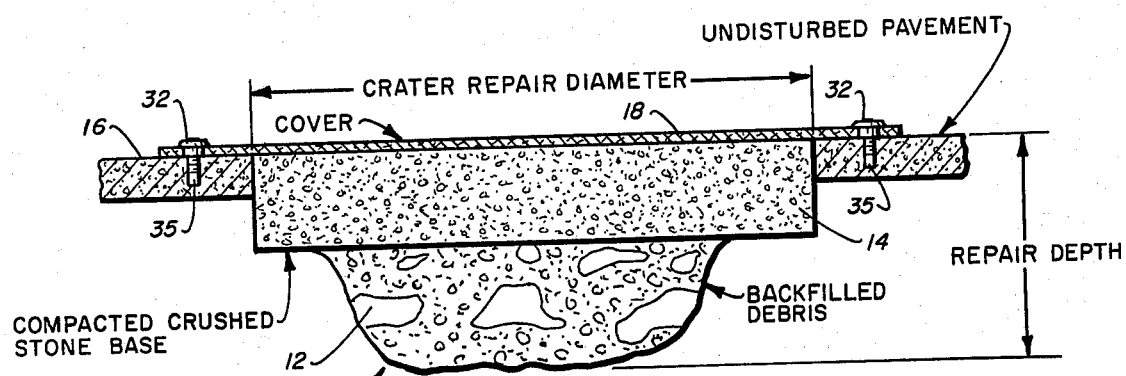
FIG. 1 illustrates the repair of a crater damaged airfield pavement using the present invention.

Referring to the drawings, and particularly to FIG. 1 which shows a profile of crater repairs, the crater 10 is backfilled with debris 12 after upheaved pavement is removed and a compacted crushed stone base 14 (approximately 24 inches in thickness, but depending upon the degree of usage of the runway area) is added. Broken pavement is removed and debris should not be placed in the crater closer than about 24 inches to the pavement surface. The crater is overfilled above pavement 16 approximately six inches with crushed stone to allow for compaction. Once the crater has been filled with crushed stone, compacted, and leveled to elimate surface roughness, a fiberglass reinforced polyester membrane cover or mat 18 (nominally ⅜-inch in thickness, for example) is placed over the crater to protect aircraft. As better shown in FIG. 2, the membrane cover 18 is prefabricated with anchor holes 20 located at intervals along the cover perimeter. Large prefabricated membranes can be cut to desired size using appropriate tools. The anchoring holes are preferably located approximately four to five inches from the edge of the membrane cover, for example.

The fiberglass reinforced plastic membrane cover 18 is formed from several layers (three, for example) of fiberglass matting. As is shown in the sectional cross-section of FIG. 3, each ply or layer of fiberglass matting 22 is made from chopped fiberglass strands 24 chemically bonded to woven fiberglass roving 26, with all voids (i.e. 28, etc.) impregnated with polyester resin. A thermosetting, low-pressure, wet layup type polyester resin is used. The cured resin when used in conjunction with 4020 style fiberglass at a 60:40 resin to glass ratio should produce a laminate having the following minimum mechanical properties:

Flexural Strength (ASTM D790–66): 28,800 psi
Tensile Strenth (ASTM D638–68): 17,000 psi
Elastic Modulus, Tension (ASTM D638–68): $1.5 \times 10^6$ psi
Barcol Hardness, #934: 55

A suitable polyester resin has been found to be PPG Industries resin designated RS50338 which contains approximately 40% styrene monomer. This polyester resin is activated by the following catalyst system:
Catalyst: Cumene Hydroperoxide
Promoter: 1:1 by volume
  N,N—Dimethyl-p-Toluidine and Vanadium Trineodecanoate
Catalyst and promoter concentrations vary between 1.2 to 0.31 (catalyst) and 0.3 to 0.08 (promoter) parts per hundred resin depending upon ambient temperature.

Figure 3:
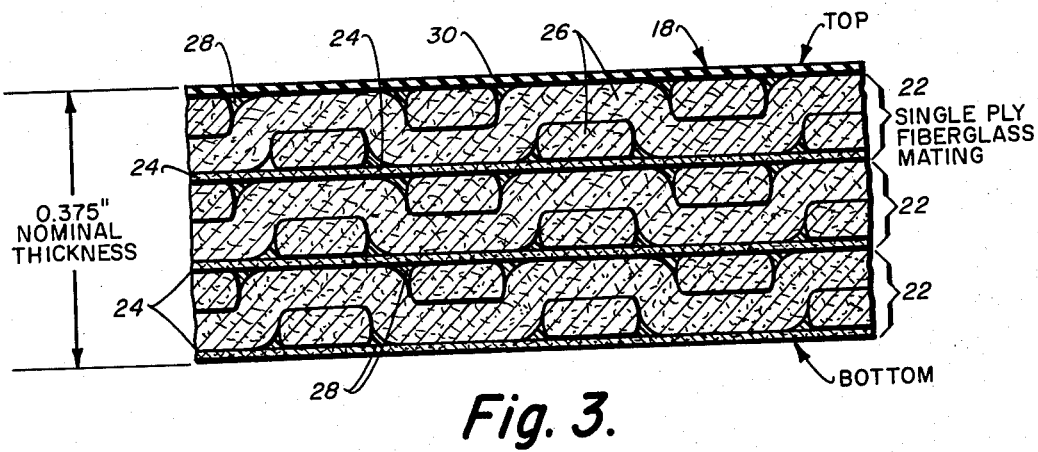
FIG. 3 shows a detailed enlargement of a section of the laminate trafficable cover shown in FIGS. 1 and 2.

The membrane cover 18 can be fabricated either on a raised platform or against the surface of a paved area, for example. Any paved smooth, plane surface having a slope of less than 1.5 percent and free of any loose debris can be used. A Bond breaker, such as a 5-mil Mylar ® film, is used at the interface with the pavement or platform surface and the first layer of fiberglass matting to prevent bonding between the fiberglass reinforced polyester and the platform or pavement surface. However, any non-porous material that will prevent bonding of the polyester resin to the platform or pavement surface can be used. The fiberglass mat layers 22, preferably three layers, as shown in FIG. 3, have the woven roving side 26 upward and the layers placed in alternating directions with adjacent strips of fiberglass matting overlapping six to eighteen inches, for example. (Preferably 4020 fiberglass matting is used, which comprises 40 oz. per square-yard woven roving 26 and 2 oz. per square-foot chopped strand 24 fiberglass fibers. Both the roving and chopped being of type E fiberglass.) Care should be taken to ensure that the fiberglass matting is smooth and free of wrinkles and properly overlapped. Approximately 2.16 gallons of polyester resin is used for each square yard of membrane cover.

The membrane cover 18 is built up in stages by alternately laying out a single ply 22 of 4020 style fiberglass and applying polyester resin until the fiberglass strands are saturated and all spaces and voids 28 in the weave and between layers are filled with the polyester resin.

The polyester resin mixture can readily be applied to each ply of the fiberglass matting with a two-component spray gun that mixes at the nozzle. The polyester resin is applied in a uniformly distributed spray pattern at a rate of about 0.8 to 0.9-lb of resin per square-foot of fiberglass matting per layer, such that the fiberglass matting is thoroughly wet-out (staurated), with care being exercised to avoid application of too much resin on the fiberglass surface that could later craze. The resin spray should be directed as vertically as possible to the matting to increase penetration of the resin. The use of a serrated roller can be used to expel any trapped air and to densify the laminate. The process is repeated until a fiberglass reinforced polyester membrane cover of three ply thickness (nominally ⅜ inch) is constructed, as shown in FIG. 3. The membrane cover 18 is then allowed to cure until hard and free of tack. Edges can then be trimmed and the cover(s) cut to desired dimensions using a carbide saw, and anchor holes 20 provided along the perimeter of each cover. A coating 30 of anti-skid material of 21 to 24 mil thickness, for example, can be added to the upper surface of the membrane cover. A typical anti-skid material would be a thermosetting epoxy based non-skid compound which includes a silica grit. Completed membrane covers are then stock piled for later use.

Figure 2:
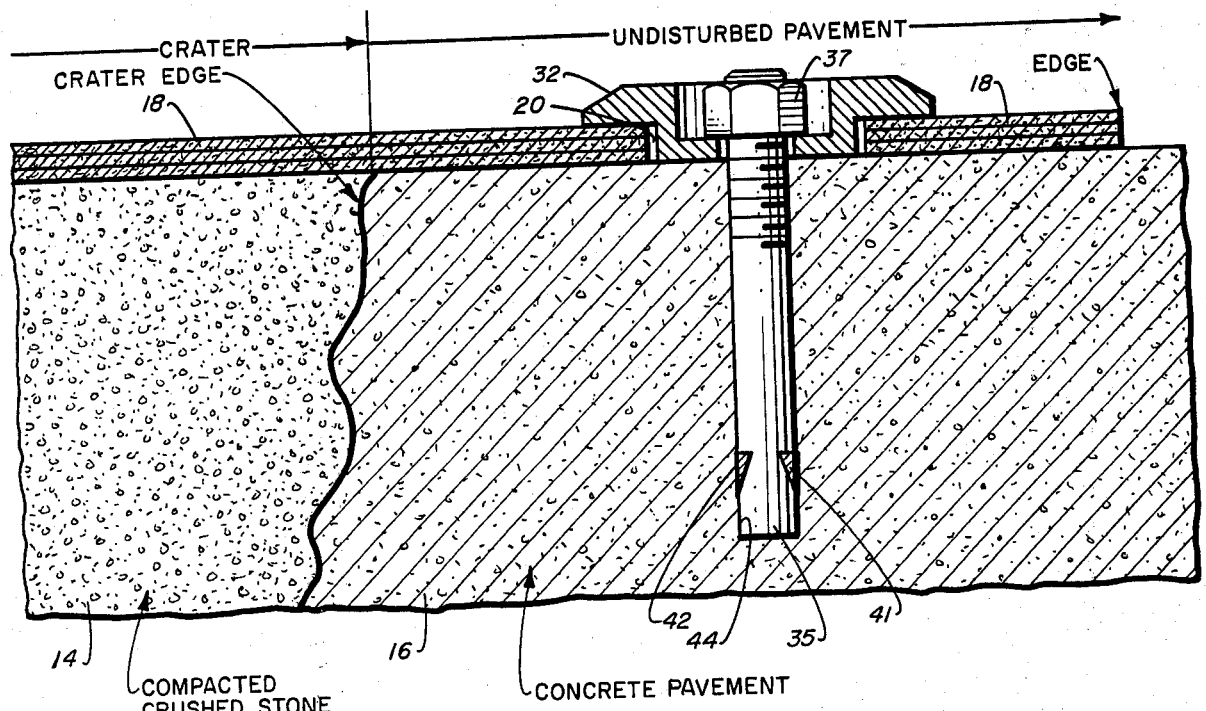
FIG. 2 shows a detailed enlargement of a portion of FIG. 1.
Figure 4:
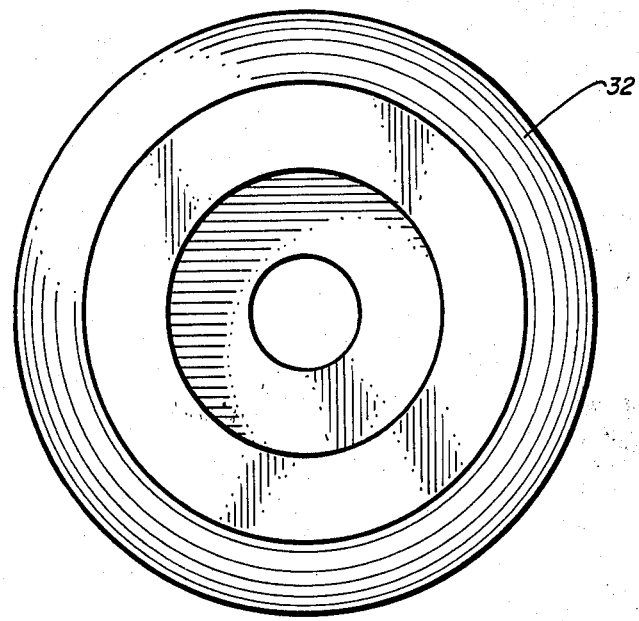
FIG. 4 is a planar view of one embodiment of an anchor bushing.

A generally low profile bushing 32, as shown in FIGS. 2 and 4, which fits the anchor holes 20 along the perimeter of the membrane cover 18 is used in conjunction with torque-set rock bolts 35 to fasten the membrane cover to the pavement 16. Holes are drilled in undisturbed concrete pavement and cleared of dust before setting the bolts 35. Hole centering is facilitated by using a template that looks similar to a bushing 32, a planar view of which is shown in FIG. 4. Bushings 32 are placed in each of the anchor holes 20 along the perimeter of the membrane cover and the rock bolts 35 inserted into the bushings. The bolts are then driven into the holes previously drilled in the pavement 16. Anchorage is completed by tightening nut 37 on the rock bolt 35 thus securely fastening the membrane cover to the pave-ment. Tightening nut 37 causes two wedges 41 and 42 (FIG. 2) to be forced against the concrete sides of the hole 44 thereby locking the bolt into place. The anchor system does not require any grout or chemicals and can be installed under adverse weather conditions. The cover provides a very low profile, and once the cover is anchored and excess materials and debris removed, the runway can be put into use again.

Figure 5A:
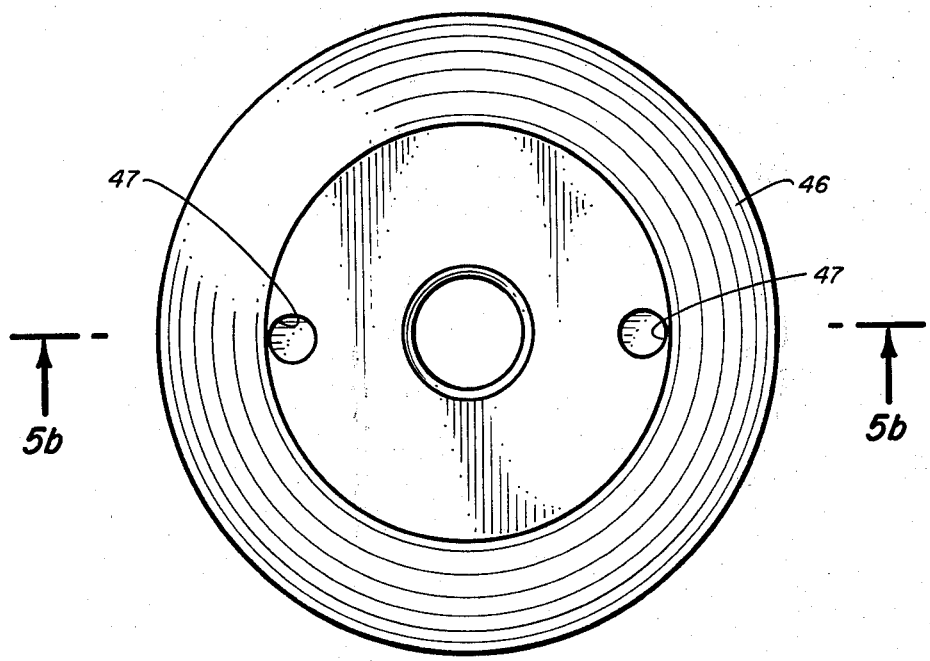
FIG. 5a is a planar view of a lower profile anchor bushing and nut combination.
Figure 5B:
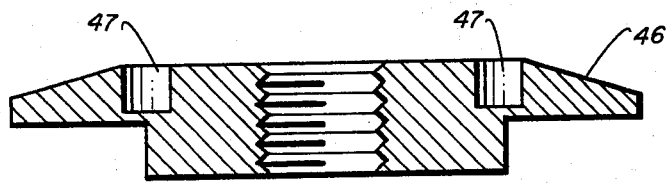

If desired for use in areas subject to aircraft tailhook impact, a combination bushing and nut 46, which threads directly onto the end of a rock bolt 35 and which has a lower profile, as shown in FIGS. 5a and 5b, can be used with each rock bolt 35 in place of a bushing 32 and a nut 37. Holes 47 are provided in bushing 46 for fitting a torquing wrench.

Figure 6:
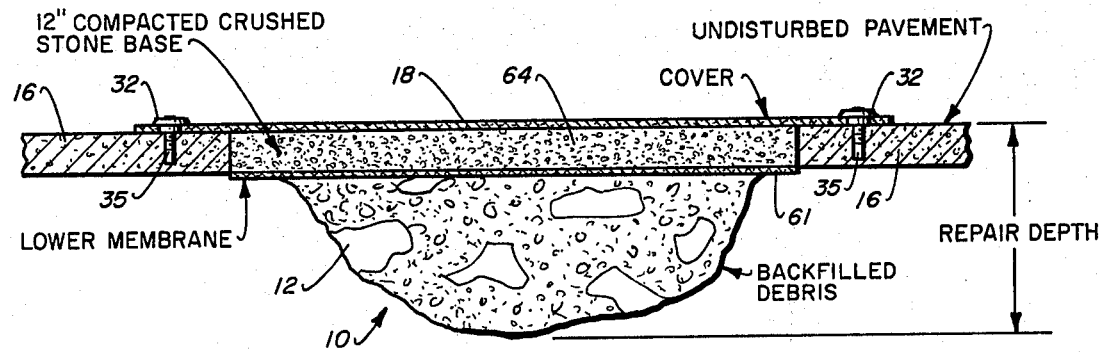
FIG. 6 shows another embodiment of the invention for the repair of crater damage to airfield pavement, using a lower fiberglass reinforced membrane.

Craters having large diameters (e.g., greater than 40-ft) can be repaired using a double membrane method, if desired. The double membrane repair method differs only in the placement of an addition fiberglass-reinforced polyester resin membrane 61 at the debris and crushed stone interface as shown in FIG. 6. The strength imparted to the section by this membrane permits a reduction of 50% in the base course (i.e. crushed stone) volume. All aspects of large crater repair is identical to those for the crater previously described, except the lower membrane 61.

Figure 7:
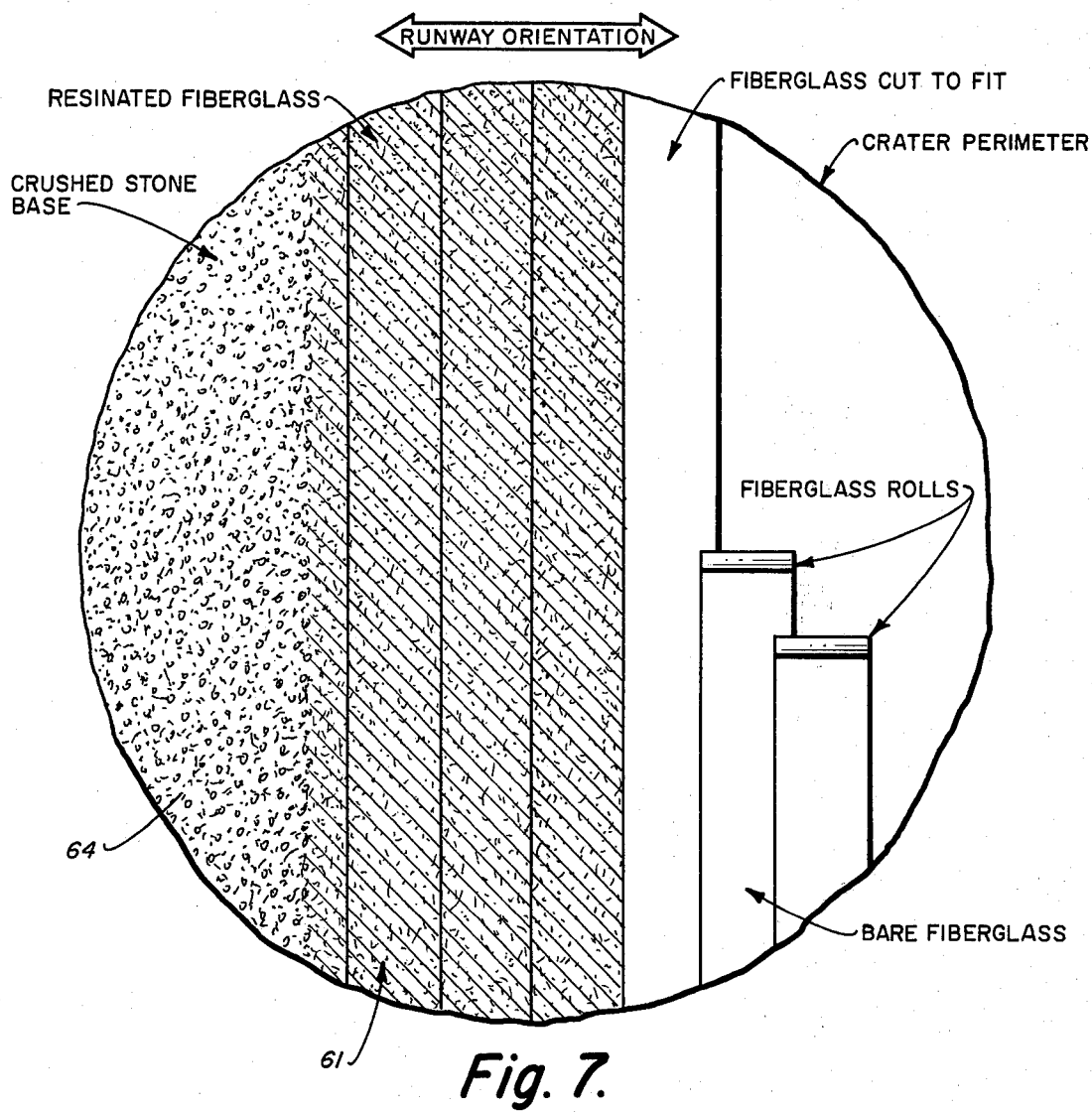
FIG. 7 illustrates in planar view a method for laying the lower membrane and crushed stone base of FIG. 7.

As shown in FIG. 6, the crater 10 is filled with usable debris 12 to within approximately 12 inches of the surface. Equipment is worked within the crater as much as practicable during debris removal/backfilling in order to achieve some consolidation of the debris backfill. The debris is rough graded at the 12-inch level using a front-end loader or an articulated motor grader or the like. The debris surface may be below 12 inches of the crater surface in some sopts, but may not project higher than this minus 12 inch level. The debris surface does not have to be completely smooth. Once the debris backfill is completed, a fiberglass matting is placed on the debris surface, cutting the fiberglass with shears to fit the hole, to form lower membrane 61. Fiberglass matting strips are placed on the debris surface with the chopped strand side of the mat against the debris, and the fiberglass strips are oriented at right angles to the runway centerline, as shown in FIG. 7. Adjacent strips are lapped by 6 to 12 inches, for example. Gaps caused by irregularity of the crater perimeter are filled with pieces of fiberglass cut to fit. Once glass placement has proceeded sufficiently to avoid interference, polyester resin spraying can be started.

Spraying usually requires two men, one with a spray gun and another to handle hose lines. The catalyst and promoter chemicals mixed with the resin are proportioned to achieve a 10-minute resin cure. Once the sprayed resin has started curing, the crushed stone 64 can be placed in the crater, as shown in FIG. 7, working from one side to the other. Equipment is not allowed to drive onto the lower membrane 61 cover until the layer of crushed stone has been placed. The rate of crushed stone placement must be controlled to prevent placing stone on a section of membrane that has not cured. The method of base course construction and the remainder of the crater repair process is identical to that previously described for a smaller crater. The only difference is in the reduction of the base course thickness from 24 inches of crushed rock to 12 inches for the large repair, although the previously described process using 24 inches of crushed rock can be used for large or small craters.

Obviously many modifications and variation of the present invention are possible in light of the above teachings. It is therefore to be understood that within the scope of the appended claims the invention may be practiced otherwise than as specifically described.

What is claimed is:

1. A method for the rapid repair of bomb damaged airfield pavements, comprising:
   a. removal of all upheaved and broken pavement around the perimeter of a bomb crater;

b. partially backfilling said crater with debris therefrom;

c. filling the remainder of said crater with compacted crushed stone which is leveled to the upper surface of the surrounding airfield pavement;

d. covering said filled crater with a low profile fiberglass reinforced polyester laminate membrane trafficable cover to minimize airfield surface roughness and prevent loose object damage to aircraft;

e. said fiberglass reinforced polyester laminate membrane trafficable cover being prefabricated in a size greater than the surface opening of said crater and being secured to said airfield pavement around the perimeter of said crater opening at a desired distance from the edge thereof by anchoring means for fastening the perimeter of said cover to said airfield pavement;

f. said fiberglass reinforced polyester laminate membrane trafficable cover, comprising:

(1) a plurality of fiberglass matting layers; each of said fiberglass matting layers consisting of a layer of chopped fiberglass strands chemically bonded to woven fiberglass roving;

(2) said fiberglass matting layers being laid in alternating directions to adjacent layers;

(3) said plurality of fiberglass matting layers being saturated (without excess) with a polyester resin to fill all voids between glass fibers and layers and the laminate cured;

wherein a relatively smooth surface is provided which will support aircraft during take off and landing.

2. A method as in claim 1 wherein a 60:40 ratio of polyester resin to fiberglass matting is used in said trafficable cover.

3. A method as in claim 1 wherein a coating of anti-skid material is added to the upper surface of said trafficable cover.

4. A method as in claim 1 wherein the fiberglass matting layers in said trafficable cover have the woven roving side upwards.

5. A method as in claim 1 wherein said fiberglass reenforced polyester laminate membrane cover has the following minimum mechanical properties: flexural strength of 28,800 psi; tensile strength of 17,000 psi; elastic modulus, tension of $1.5 \times 10^6$ psi; and, Barcol hardness (#934) of 55.

6. A method as in claim 1 wherein said polyester resin being thermosetting, low-pressure, wet layup type.

7. A method as in claim 1 wherein said fiberglass matting comprises 40 oz. per square-yard woven roving and 2 oz. per square-foot chopped strand, both being type E fiberglass.

8. A method as in claim 1 wherein said cover is anchored to the airfield pavement using low profile bushings which fit into anchoring holes cut along the perimeter of said trafficable cover together with anchor bolts which pass through said bushings and are set into matching holes drilled into said airfield pavement.

9. A method as in claim 1 wherein said trafficable cover laminate following saturation with the polyester resin being treated with a serrated roller to expel any trapped air and to densify the laminate prior to curing.

10. A method as in claim 1 wherein said anchor bolts being of the type having wedges which lock aginst the sides of holes in the airfield pavement as a fastening nut at the top thereof is tightened.

11. A method as in claim 10 wherein said fastening nut at the top of the anchor bolt is a combination low profile bushing and nut.

12. A method as in claim 1 wherein a lower fiberglass reinforced polyester membrane is formed over the compacted debris and is cured prior is filling the remainder of the crater with compacted crushed stone and leveled.

13. A low-profile fiberglass reinforced polyester laminate membrane trafficable cover for use over compacted backfilled bomb craters to rapidly repair crater damage airfield pavements, comprising:

a. a plurality of fiberglass mats, each fiberglass mat consisting of a layer of chopped fiberglass strands chemically bonded to a layer of woven fiberglass roving;

b. said fiberglass mats being laid in alternating directions to adjacent mats;

c. said plurality of fiberglass mats being saturated (without excess) with a polyester resin to fill all voids between the glass fibers and layers, and the laminate cured;

d. a plurality of anchoring holes provided around the perimeter of said cover;

e. a low profile bushing and anchor bolt provided for each of said anchoring holes for fastening said trafficable cover to corresponding anchor bolt holes in airfield pavement about the perimeter of a crater being repaired.

14. A low-profile fiberglass reinforced polyester laminate membrane trafficable cover as in claim 13 wherein a 60:40 ratio of polyester resin to fiberglass matting is used in said trafficable cover.

15. A low-profile fiberglass reinforced polyester laminate membrane trafficable cover as in claim 13 wherein a coating of anti-skid material is added to the upper surface of said trafficable cover.

16. A low-profile fiberglass reinforced polyester laminate membrane trafficable cover as in claim 13 wherein the fiberglass matting layers in said trafficable cover have the woven roving side upwards.

17. A low-profile fiberglass reinforced polyester laminate membrane trafficable cover as in claim 13 wherein said fiberglass reinforced polyester laminate membrane cover has the following minimum mechanical properties: flexural strength of 28,800 psi; tensile strength of 17,000 psi; elastic modulus, tension of $1.5 \times 10^6$ psi; and, Barcol hardness (#934) of 55.

18. A low-profile fiberglass reinforced polyester laminate membrane trafficable cover as in claim 13 wherein said polyester resin being thermosetting, low-pressure, wet-layup type.

19. A low-profile fiberglass reinforced polyester laminate membrane trafficable cover as in claim 13 wherein said fiberglass matting comprises 40 oz. per square-yard woven roving and 2 oz. per square-foot chopped strand, both being type E fiberglass.

20. A low-profile fiberglass reinforced polyester laminate membrane trafficable cover as in claim 13 wherein said trafficable cover laminate following saturation with the polyester resin being treated with a serrated roller to expel any trapped air and to densify the laminate prior to curing.

* * * * *